No. 752,952. PATENTED FEB. 23, 1904.
M. G. BROWNELL.
RUBBER LIKE GUM.
APPLICATION FILED SEPT. 21, 1903.
NO MODEL. 2 SHEETS—SHEET 1.

No. 752,952.

Patented February 23, 1904.

UNITED STATES PATENT OFFICE.

MYRON G. BROWNELL, OF DENVER, COLORADO.

RUBBER-LIKE GUM.

SPECIFICATION forming part of Letters Patent No. 752,952, dated February 23, 1904.

Application filed September 21, 1903. Serial No. 174,102. (No specimens.)

*To all whom it may concern:*

Be it known that I, MYRON G. BROWNELL, a citizen of the United States of America, residing at the city and county of Denver, and State of Colorado, have invented a certain new and useful Rubber-Like Gum; and I do declare the following to be a full, clear, and exact description of the invention, such as will enable others skilled in the art to which it appertains to make and use the same.

My invention contemplates the production of a particular rubber-like gum in a pure form, being in the nature of an improvement on the gum disclosed in my other application, Serial No. 172,455, in which former application I have described a new gum made by suitably separating and agglomerating the gummy particles contained in the plant *Picradenia floribunda utilis* and also a process in which the said plant is used for producing gum.

I have invented and will describe a simple and comparatively economical process whereby the pure gum may be produced at a comparatively small cost. No claim to the process, however, will be made in this particular application.

Figure 2:
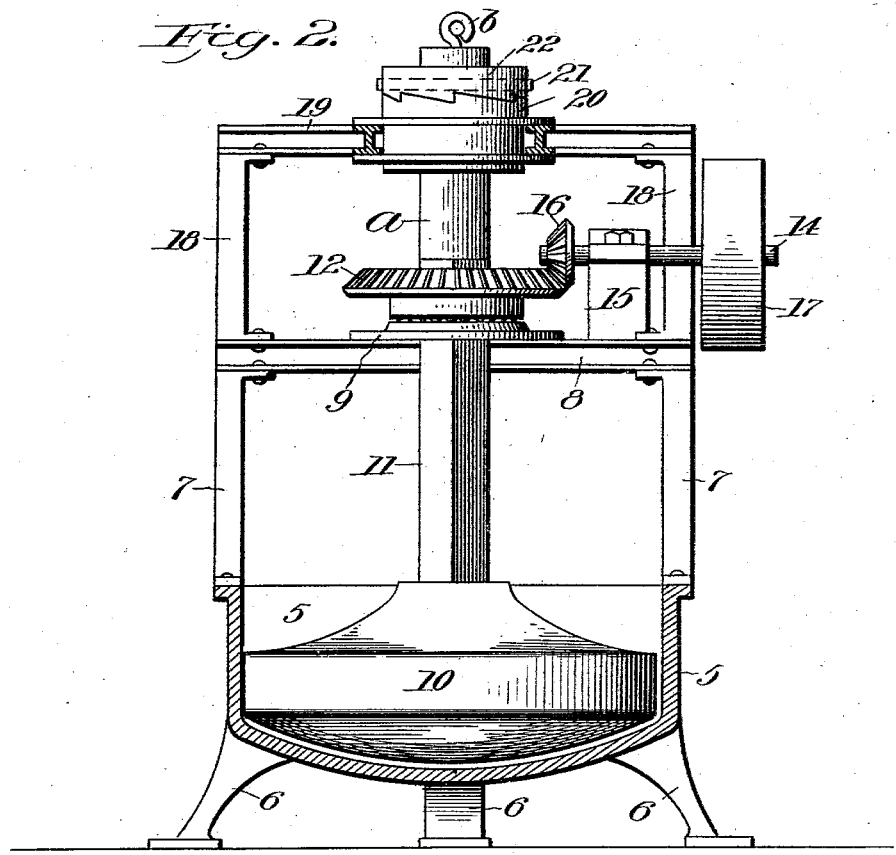
Figure 3:
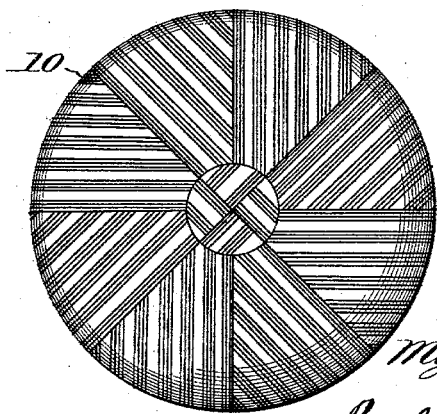

In the accompanying drawings, Figure 1 graphically indicates the several steps of the hereinafter-described process for making the new gum or product. Fig. 2 is a side elevation, partially in vertical section, of a machine which may be employed for carrying out the step of subjecting the plant, suitably prepared, of course, to the compressive rubbing or working action for the purpose of effecting the desired agglomeration of the gummy particles contained in the plant. Fig. 3 is a bottom view—that is, a face view—of the plunger employed in said machine.

Figure 1:
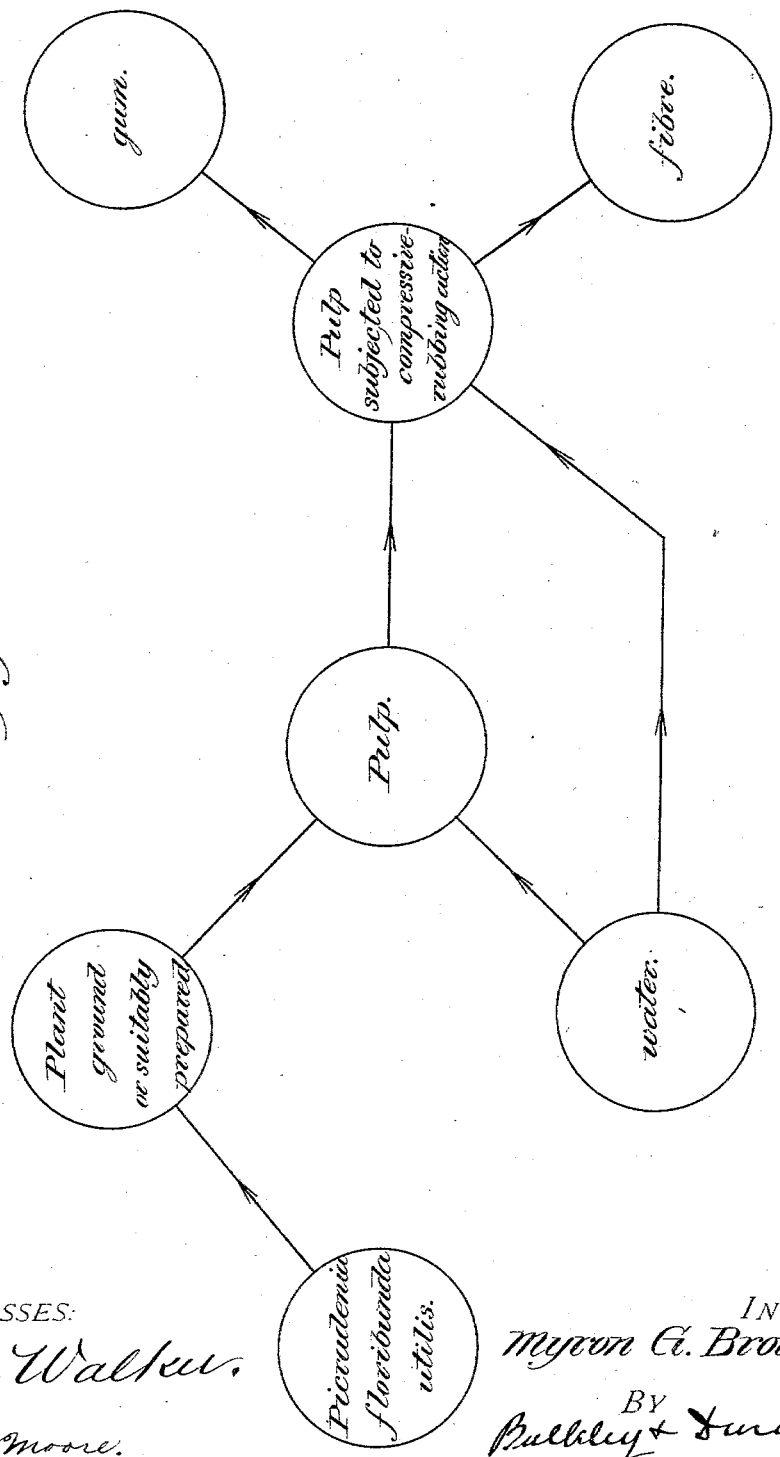

Referring then more particularly to Fig. 1, it will be seen that the first step of the preferred process consists in providing a suitable quantity of the plant *Picradenia floribunda utilis*, preferably cleaned and dried. The next step consists in grinding, comminuting, or otherwise suitably preparing the plant. After this the ground comminuted plant is mixed with water is such proportion, preferably, as to reduce the same to a sort of pulp. The pulp is then subjected to a compressive rubbing or working action in the machine hereinafter referred to, as will hereinafter more fully appear, the object being to separate the minute gummy particles contained in the plant and then agglomerate these particles into a coherent mass or masses. Obviously then this step in the process may be continued or repeated until the gummy particles and the fiber of the plant have become thoroughly separated and until all of the minute gummy particles thus separated have become agglomerated into a coherent mass or masses. Obviously any suitable expedient can be employed for subjecting the pulp to the action of heat during the rubbing or working portion of the process. For example, the water employed in forming the pulp can be hot, and in this way the gummy particles during the rubbing, kneading, or working portion of the process are rendered more adhesive and the desired agglomeration is thus facilitated.

As indicated in Fig. 1 of the drawings, the latter part of the rubbing, working, or kneading process may be accompanied by a washing action—as, for example, by supplying water directly to the receptacle of the machine in which the pulp is being manipulated or worked. In this way the fiber and gum are separated—that is to say, the fiber is separated from the coherent mass or masses formed by agglomerating the separated gummy particles of the plant. Thus as a result of this operation or step the new gum and the fiber are taken off in different directions, so to speak.

It is of course obvious that the apparatus may be of any suitable known or approved character. Any suitable machine may be employed for grinding, comminuting, or otherwise suitably preparing the plant; also any suitable or desired arrangement can be employed for forming the pulp. The machine for then subjecting the pulp to a rubbing, working, or kneading action may also be of any suitable or desired character—as, for example, such as is shown in Figs. 2 and 3 of the drawings. This machine, it will be observed, comprises a receptacle 5, adapted to receive the plunger 10, which latter is secured to the lower end of a vertically-disposed shaft *a*, having a squared or polygonal portion 11.

A framework supported on the receptacle and comprising the bars 7, 18, and 19 may be employed as the means for supporting the bearings for the shaft $a$, also the driving-shaft 14 having the pulley 17. The squared or polygonal portion 11 is adapted to fit and slide up and down in a similarly-shaped opening in the bevel-gear 12, which rests on a bearing 9. This bevel-gear is engaged by a bevel-pinion 16 on the shaft 14, the latter being supported in bearing 15. The shaft thus mounted for rotation and vertical reciprocation may be provided at its upper end with a toothed or cam member 22, adapted to coöperate with a similarly-formed member 20, the latter being rigid with the frame. The upper end of the shaft $a$ can be provided with a ring or eye $b$, whereby the plunger may be raised out of the receptacle to permit the pulp to be introduced therein. The cam member 22 is secured to the shaft by a pin or key 21. The structure as a whole may be suitably supported by legs 6, secured to the bottom of the receptacle, and, as shown in Fig. 3, the face or bottom of the said plunger 10 is preferably provided with corrugations or it may be roughened in any other suitable manner. With this construction the rotation of the plunger while resting on the pulp in the receptacle is accompanied by a constant up-and-down movement or vertical reciprocation due to the rotation of the cam member 22, having the teeth on its lower surface on the cam member 20, which latter has the teeth or cam portions formed on its upper surface. Consequently the pulp while being manipulated in a hot state in the receptacle is subjected to a constant compressive rubbing, kneading, or working action. This, as already explained, results in the separation and agglomeration of the minute gummy particles contained in the plant. Moreover, it will be seen that this process is not only of a simple and comparatively economical character, but is also characterized by the production of a gum consisting, essentially, of the pure unadulterated particles contained in the plant *Picradenia floribunda utilis*.

What I claim as my invention is—

As a new article of manufacture, a plastic rubber-like body, consisting essentially of the pure or unadulterated gummy particles contained in the plant *Picradenia floribunda utilis*, separated and agglomerated into a coherent mass, insoluble in water but soluble in light hydrocarbons, such as gasolene, substantially as described.

In testimony whereof I affix my signature in presence of two witnesses.

MYRON G. BROWNELL.

Witnesses:
   DENA NELSON,
   A. J. O'BRIEN.